(12) United States Patent
Kiriyama et al.

(10) Patent No.: US 12,010,280 B2
(45) Date of Patent: Jun. 11, 2024

(54) MACHINE LEARNING DEVICE, MACHINE LEARNING METHOD, AND MACHINE LEARNING PROGRAM

(71) Applicant: KONICA MINOLTA, INC., Tokyo (JP)

(72) Inventors: Tomohiro Kiriyama, Kouhu (JP); Koichi Saito, Toyohashi (JP); Shun Sugai, Hino (JP); Kazuhiko Kowase, Toyokawa (JP); Naoshi Kashiwagura, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 912 days.

(21) Appl. No.: 16/923,509

(22) Filed: Jul. 8, 2020

(65) Prior Publication Data

US 2021/0029255 A1    Jan. 28, 2021

(30) Foreign Application Priority Data

Jul. 22, 2019    (JP) ................................. 2019-134502

(51) Int. Cl.
*H04N 1/00* (2006.01)
*G05B 13/04* (2006.01)
*G06N 20/00* (2019.01)

(52) U.S. Cl.
CPC ......... *H04N 1/0061* (2013.01); *G05B 13/047* (2013.01); *G06N 20/00* (2019.01); *H04N 1/00082* (2013.01); *H04N 2201/0094* (2013.01)

(58) Field of Classification Search
CPC .. G06N 20/00; G06F 18/2415; G05B 13/042; G05B 13/0265; G06Q 40/08; B65H 7/20
See application file for complete search history.

(56) References Cited

U.S. PATENT DOCUMENTS 9,207,893 B2 * 12/2015 Hasegawa .......... G06K 15/1823
10,096,067 B1 * 10/2018 Slusar .................... G06Q 40/08
(Continued)

FOREIGN PATENT DOCUMENTS

| CN | 101739601 A | 6/2010 |
|---|---|---|
| CN | 102556713 A | 7/2012 |

(Continued)

OTHER PUBLICATIONS

First Office Action issued in Chinese Patent Application No. 202010685334.2, dated Apr. 28, 2022, with English Translation (16 pages).

(Continued)

*Primary Examiner* — Saba Dagnew
(74) *Attorney, Agent, or Firm* — BUCHANAN INGERSOLL & ROONEY PC

(57) ABSTRACT

A machine learning device learns an action of a driving source in a transport device continuously transporting at least two transported objects along a transport path, and includes: a hardware processor that: acquires position information of the at least two transported objects on the transport path on the basis of a result of detection by a sensor provided in the transport path; calculates a reward on the basis of the position information acquired, according to a predetermined rule; learns an action by calculating an action value in reinforcement learning on the basis of the position information acquired and the reward calculated; and generates and outputs control information that causes the driving source to perform an action determined on the basis of a learning result.

17 Claims, 14 Drawing Sheets

(56) References Cited

U.S. PATENT DOCUMENTS

| | | | | |
|---|---|---|---|---|
| 2009/0057997 A1* | 3/2009 | Hatada | .................... | B65H 7/20 |
| | | | | 271/270 |
| 2011/0091261 A1* | 4/2011 | Honma | ................ | B65H 5/062 |
| | | | | 271/10.13 |
| 2018/0181089 A1* | 6/2018 | Fuji | ...................... | G05B 13/042 |
| 2018/0322715 A1* | 11/2018 | Toyoda | ............... | B62D 15/029 |
| 2019/0227502 A1* | 7/2019 | Nakamura | ......... | G05B 13/0265 |
| 2019/0378042 A1* | 12/2019 | Tuzi | ...................... | G06N 20/00 |

FOREIGN PATENT DOCUMENTS

| | | | |
|---|---|---|---|
| JP | H05201564 A | 8/1993 |
| JP | 2007079011 A | 3/2007 |
| JP | 2008181024 A | 8/2008 |
| JP | 2013238682 A | 11/2013 |
| JP | 2017034844 A | 2/2017 |
| JP | 2019034836 A | 3/2019 |

OTHER PUBLICATIONS

Notice of Reasons for Refusal issued in Japanese Patent Application No. 2019-134502, dated May 9, 2023, with English Translation (12 pages).

Decision of Refusal issued in Japanese Patent Application No. 2019-134502, dated Oct. 24, 2023, with English Translation (8 pages).

* cited by examiner

FIG. 7A

| STATE | Sensor1 | Sensor2 | Sensor3 | Sensor4 | Sensor5 | Sensor6 | Sensor7 | Sensor8 | Sensor9 | Sensor10 | Sensor11 | Sensor12 | Sensor13 | Sensor14 |
|---|---|---|---|---|---|---|---|---|---|---|---|---|---|---|
| s1 | OFF | OFF | OFF | OFF | OFF | OFF | OFF | OFF | OFF | OFF | OFF | OFF | OFF | OFF |
| s2 | ON | OFF | OFF | OFF | OFF | OFF | OFF | OFF | OFF | OFF | OFF | OFF | OFF | OFF |
| s3 | OFF | ON | OFF | OFF | OFF | OFF | OFF | OFF | OFF | OFF | OFF | OFF | OFF | OFF |
| s4 | OFF | OFF | ON | OFF | OFF | OFF | OFF | OFF | OFF | OFF | OFF | OFF | OFF | OFF |
| s5 | OFF | OFF | OFF | ON | OFF | OFF | OFF | OFF | OFF | OFF | OFF | OFF | OFF | OFF |
| ... | ... | ... | ... | ... | ... | ... | ... | ... | ... | ... | ... | ... | ... | ... |
| s16384 | ON | ON | ON | ON | ON | ON | ON | ON | ON | ON | ON | ON | ON | OFF |

| ACTION | FEED CL | TmgCL | DISCHARGE CL |
|---|---|---|---|
| a1 | OFF | OFF | OFF |
| a2 | ON | OFF | OFF |
| a3 | OFF | ON | OFF |
| a4 | ON | ON | OFF |
| a5 | OFF | OFF | ON |
| a6 | OFF | ON | ON |
| a7 | ON | OFF | ON |
| a8 | OFF | ON | ON |

| STATE | ACTION A | | | | | | |
|---|---|---|---|---|---|---|---|
| | a1 | a2 | a3 | ... | ... | a7 | a8 |
| s1 | 0.7 | 0.3 | 0.12 | ... | ... | 0.5 | 0.5 |
| s2 | 0.8 | 0.2 | 0.33 | ... | ... | 0.5 | 0.5 |
| s3 | 0.65 | 0.35 | 0.22 | ... | ... | 0.5 | 0.5 |
| s4 | 0.33 | 0.67 | 0.35 | ... | ... | 0.5 | 0.5 |
| s5 | 0.6 | 0.4 | 0.16 | ... | ... | 0.5 | 0.5 |
| ... | ... | ... | ... | ... | ... | ... | ... |
| s16384 | 0.6 | 0.4 | 0.16 | ... | ... | 0.5 | 0.5 |

Ns, Na

MACHINE LEARNING DEVICE, MACHINE LEARNING METHOD, AND MACHINE LEARNING PROGRAM

The entire disclosure of Japanese patent Application No. 2019-134502, filed on Jul. 22, 2019, is incorporated herein by reference in its entirety.

BACKGROUND

Technological Field

The present invention relates to a machine learning device, a machine learning method, and a machine learning program for learning an action of a driving source in a transport device controlling transport of a plurality of moving objects, and more particularly relates to a machine learning device, a machine learning method, and a machine learning program for learning an action of a driving source in an image forming device controlling transport of a plurality of sheets.

Description of the Related Art

Image forming devices such as multi-functional peripherals (MFPs) are under different use environments and use conditions depending on the user who uses the machine, which causes variations in the state of the machine and variations in the likelihood of occurrence of a jam caused by bending or pulling of a sheet being transported. In the event of a jam, the machine is stopped to require maintenance and experience downtime until the maintenance is performed, whereby optimal control corresponding to the state of the machine is required.

However, the combinations of the use environments and the use conditions are extensive, so that a considerable amount of man-hours for development is required to design control that assumes every use environment and use condition. Thus, a related art designs control such that a jam does not occur under the worst condition or typical condition, but such a method may not achieve optimal control under unexpected conditions and cannot gain customer satisfaction.

In order to solve such a problem, a method of obtaining a control condition for a device using machine learning has been proposed. For example, JP 2017-034844 A discloses a machine learning device that learns a condition associated with adjustment of a current gain parameter in motor control, the machine learning device including: a state observation unit that acquires an integral gain function and a proportional gain function of a current control loop, acquires the actual current, and observes state variables including at least one of an amount of overshoot, an amount of undershoot, and rise time of the actual current with respect to a step torque command, the integral gain function, and the proportional gain function; and a learning unit that learns the condition associated with adjustment of the current gain parameter according to a training data set including the state variables.

However, in the case of an image forming device, in addition to environmental conditions such as temperature and humidity, printing conditions such as life of each component, slip ratio, paper type, basis weight, size, printing mode, and coverage rate cause variations in the state of transport a sheet, and the likelihood of occurrence of a jam varies depending on the actual state of transport of a sheet. Therefore, the use of the technique disclosed in JP 2017-034844 A cannot obtain a control condition for transporting a sheet without causing a jam.

SUMMARY

The present invention has been made in view of the above problem, and a main object of the present invention is to provide a machine learning device, a machine learning method, and a machine learning program that can generate control information of a driving source for properly transporting transported objects.

To achieve the abovementioned object, according to an aspect of the present invention, there is provided a machine learning device that learns an action of a driving source in a transport device continuously transporting at least two transported objects along a transport path, and the machine learning device reflecting one aspect of the present invention comprises: a hardware processor that: acquires position information of the at least two transported objects on the transport path on the basis of a result of detection by a sensor provided in the transport path; calculates a reward on the basis of the position information acquired, according to a predetermined rule; learns an action by calculating an action value in reinforcement learning on the basis of the position information acquired and the reward calculated; and generates and outputs control information that causes the driving source to perform an action determined on the basis of a learning result.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 7A to 7C are tables illustrating a relationship between a state and an action in the sheet transport path of the image forming device according to an embodiment of the present invention;

DETAILED DESCRIPTION OF EMBODIMENTS

Figure 1:
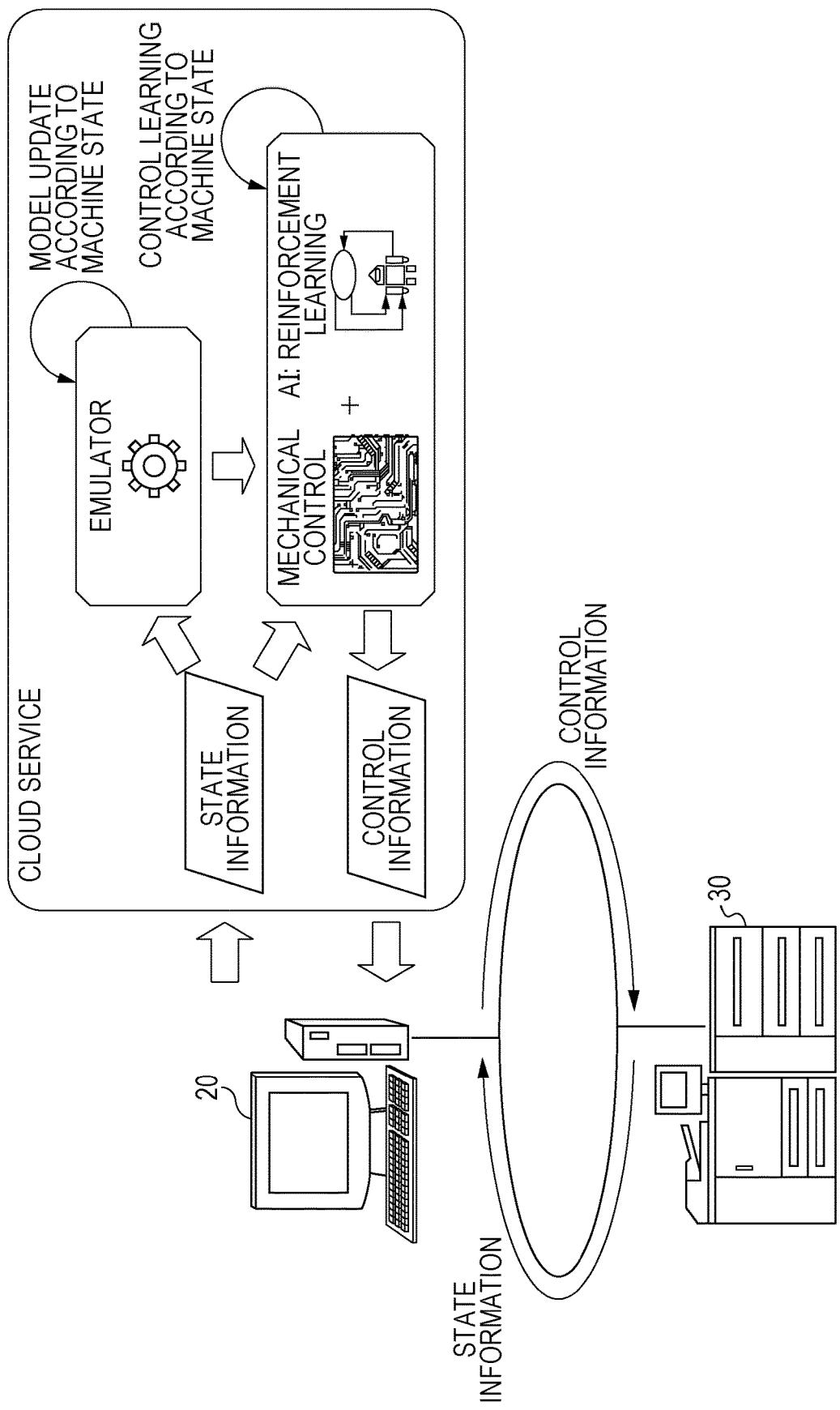
FIG. 1 is a schematic diagram illustrating a configuration of a control system according to an embodiment of the present invention.

Hereinafter, one or more embodiments of the present invention will be described with reference to the drawings. However, the scope of the invention is not limited to the disclosed embodiments.

As described in the related art, an image forming device such as an MFP is under different use environments and use conditions depending on the user who uses the machine, which causes variations in the state of the machine and variations in the likelihood of occurrence of a jam caused by bending or pulling of a sheet being transported. Due to such background, optimal control corresponding to the state of the machine is required, but the combinations of the use environments and the use conditions are extensive so that a considerable amount of man-hours for development is required to design control that assumes every use environment and use condition. Thus, the related art designs control such that a jam does not occur under the worst condition or typical condition, but such a method may not achieve the optimal control under unexpected conditions.

Thus, an embodiment of the present invention achieves the optimal control of a driving source by using machine learning (particularly reinforcement learning) of artificial intelligence (AI) and learning an action of the driving source on the basis of an actual state of a transported object that varies depending on the use environments and use conditions (humidity, temperature, life, slip ratio, paper type, basis weight, size, printing mode, coverage rate, and the like) of the machine by the user.

Specifically, a machine learning device that learns an action of a driving source in a transport device continuously transporting at least two transported objects along a transport path acquires position information of the at least two transported objects on the transport path on the basis of a result of detection by a sensor provided in the transport path, calculates a reward on the basis of the position information acquired according to a predetermined rule, learns an action by calculating an action value in reinforcement learning on the basis of the position information acquired and the reward calculated, and generates and outputs control information that causes the driving source to perform an action determined on the basis of a learning result.

For example, in a system including a machine learning device and an image forming device, when a sheet starts to be transported, the machine learning device acquires position information of the sheet, calculates a reward according to a preset rule, learns an action by calculating an action value in reinforcement learning on the basis of the position information and the reward, and generates and outputs control information that causes a driving source to perform an action determined on the basis of a learning result. The image forming device acquires the control information and controls the driving source by updating firmware each time the control information is acquired or collectively.

As described above, the reinforcement learning is applied to the transport control of a transported object such as the sheet and calculates the action value by giving the appropriate reward to the target action, whereby learning can be performed on various states, the transport control of the transported object suitable for the use environment and use condition of the machine by the user can be constructed automatically, and unnecessary downtime can be reduced.

Embodiment

Figure 2:
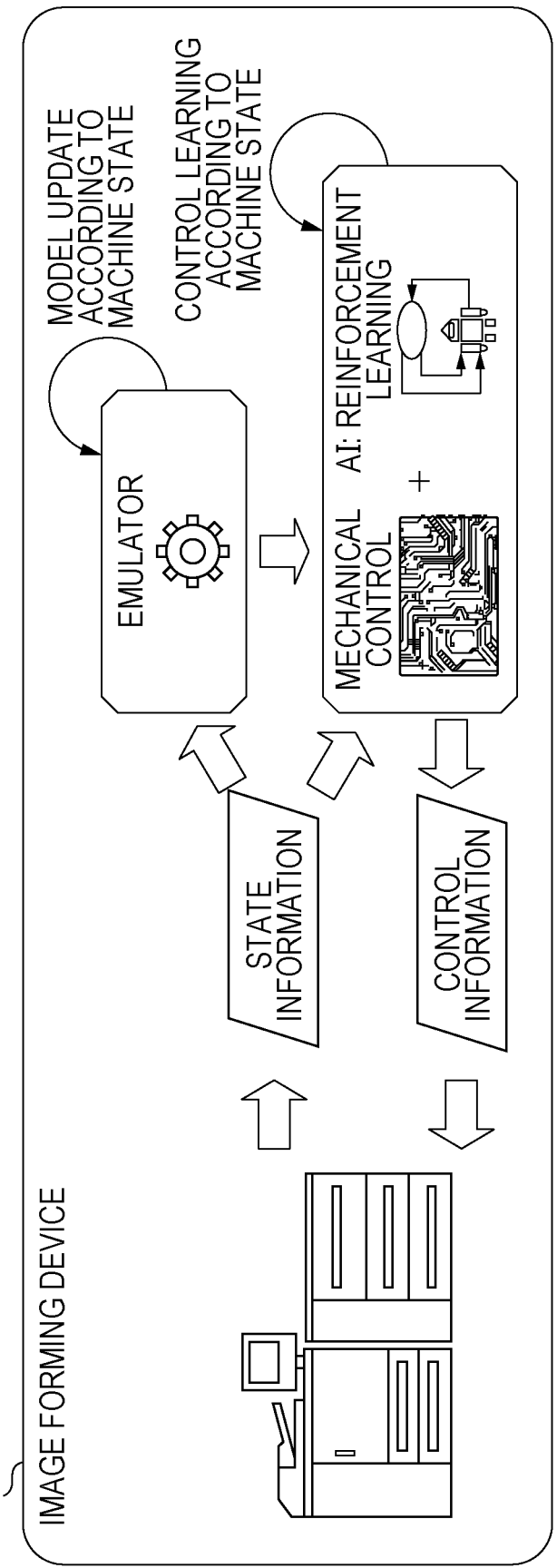
FIG. 2 is a schematic diagram illustrating another configuration of the control system according to an embodiment of the present invention.
Figure 3A:
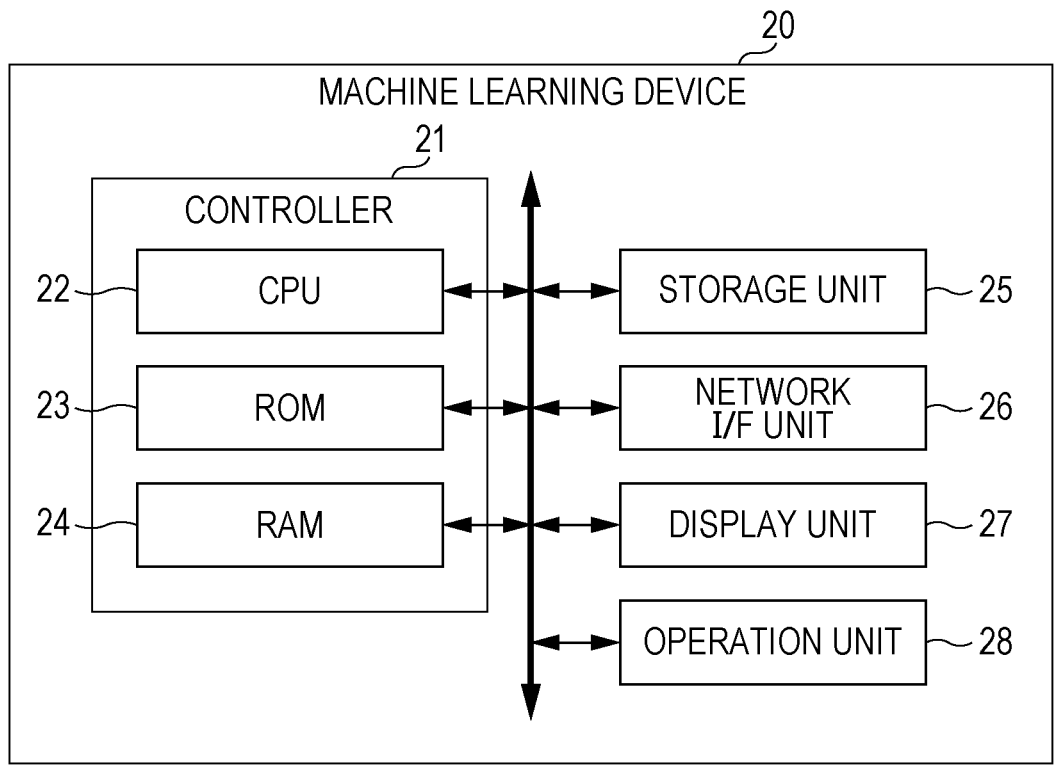
FIGS. 3A and 3B are block diagrams each illustrating a configuration of a machine learning device according to an embodiment of the present invention.
Figure 3B:
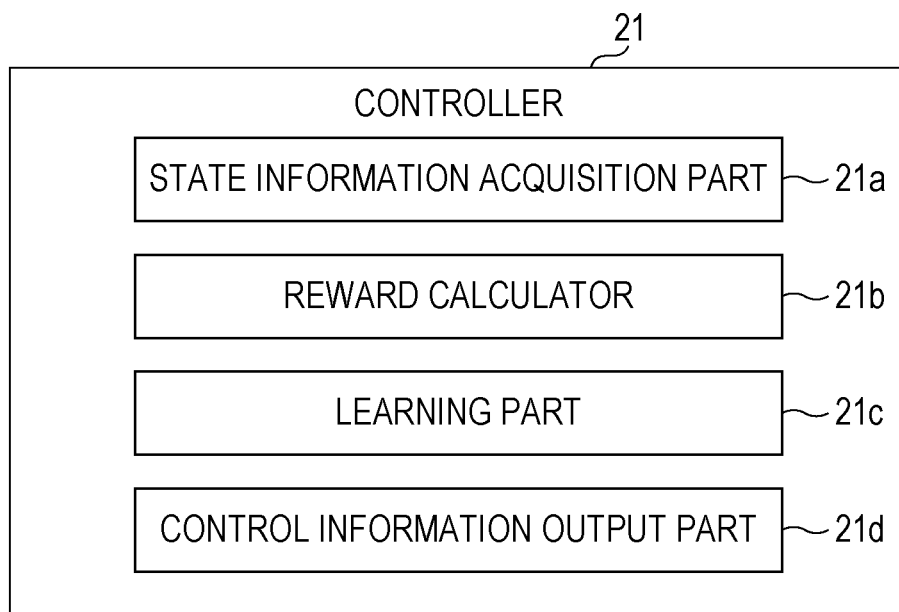
Figure 4A:
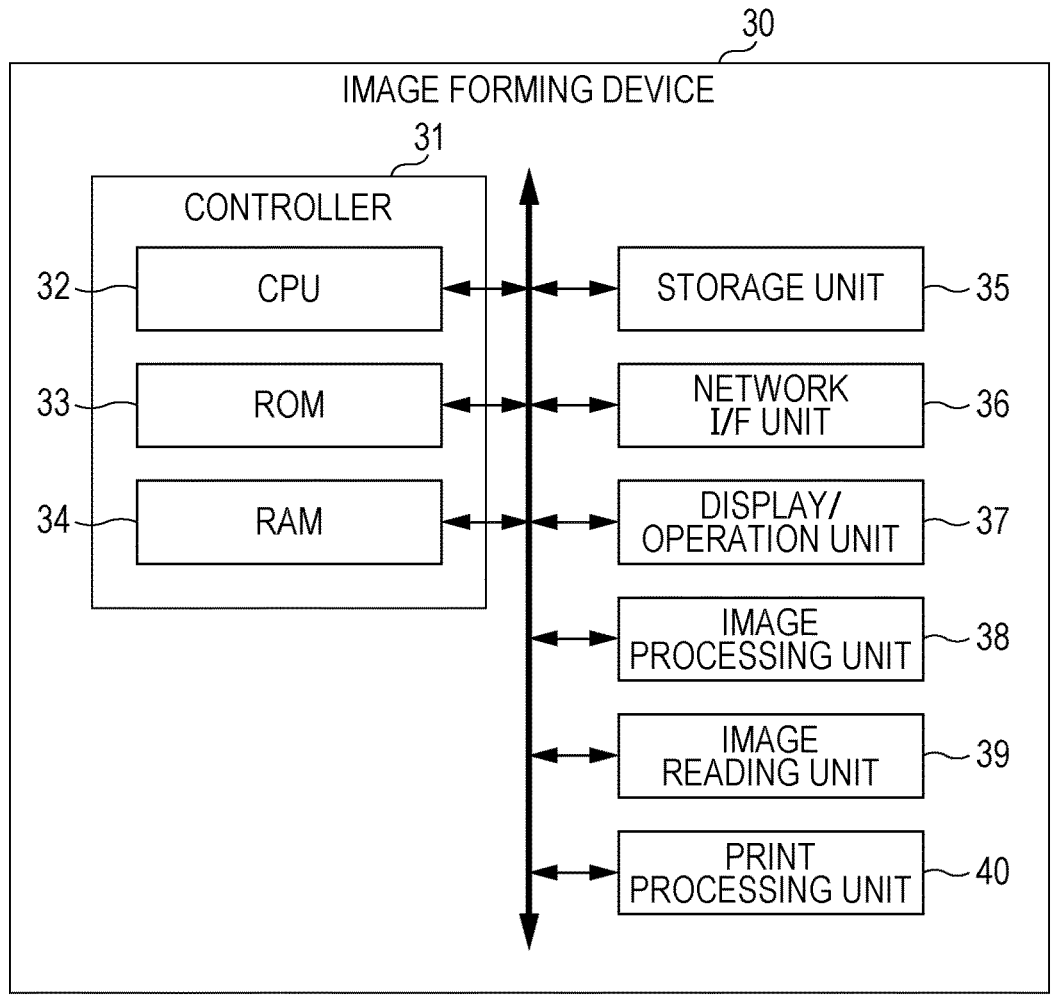
FIGS. 4A and 4B are block diagrams each illustrating a configuration of an image forming device according to an embodiment of the present invention.
Figure 4B:
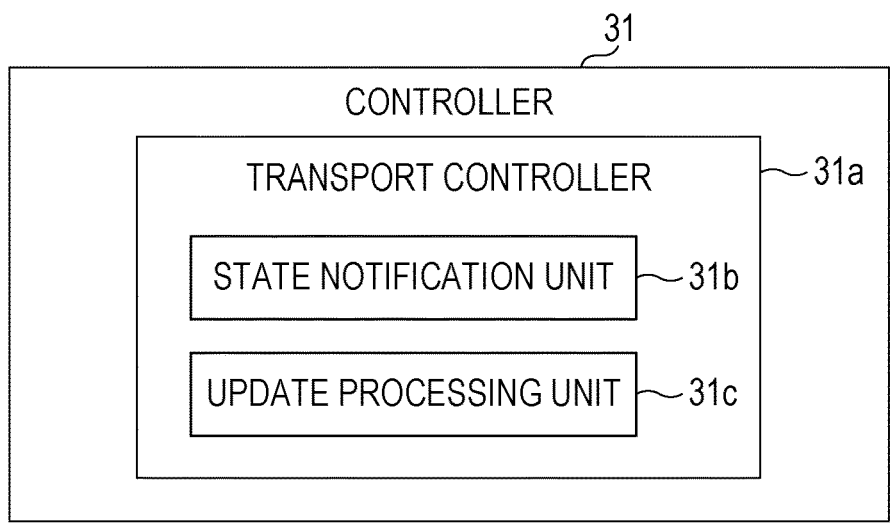
Figure 5:
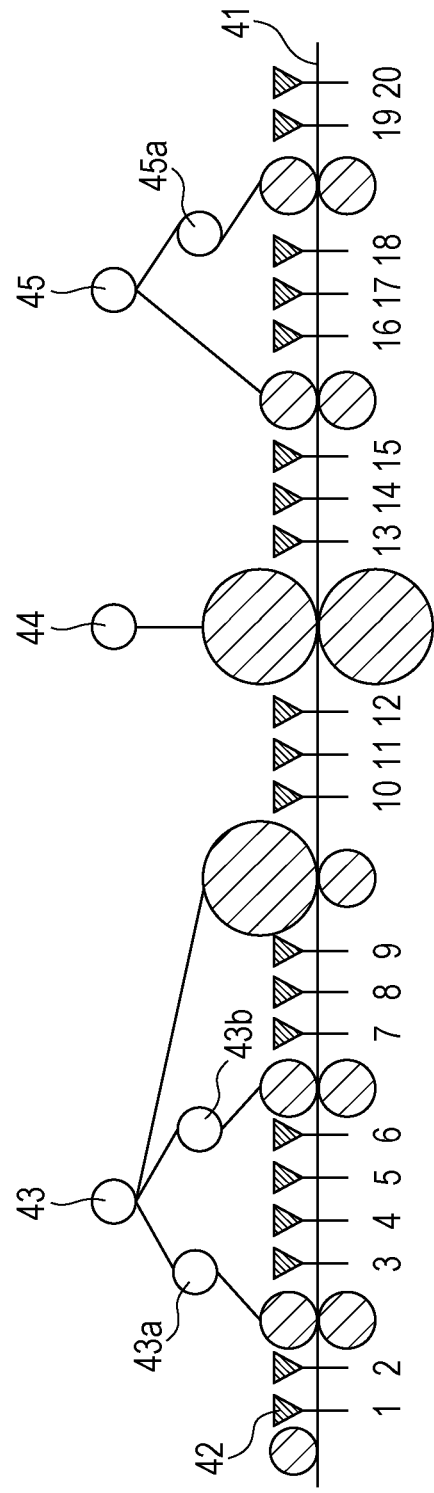
FIG. 5 is a schematic diagram describing sensors and driving sources in a sheet transport path of the image forming device according to an embodiment of the present invention.
Figure 6:
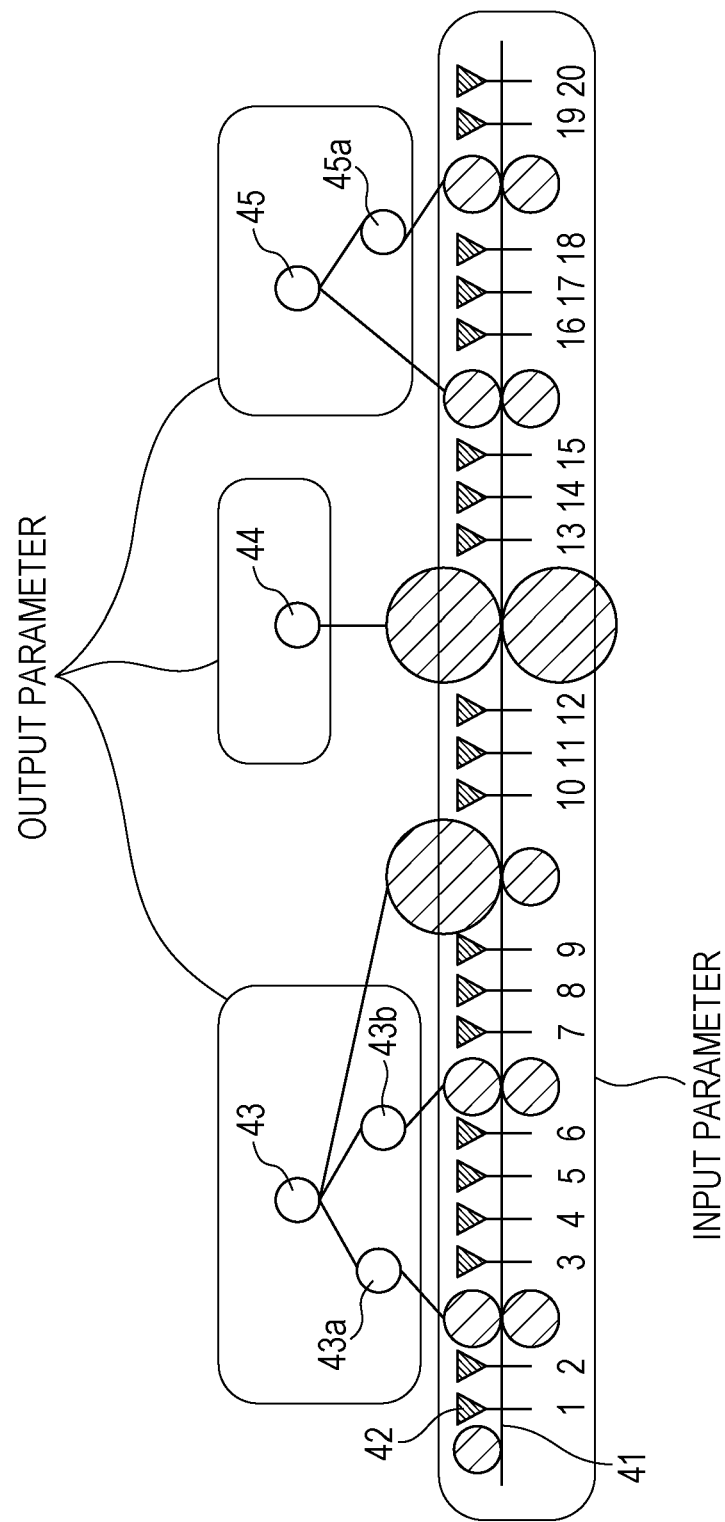
FIG. 6 is a schematic diagram describing input/output parameters in the sheet transport path of the image forming device according to an embodiment of the present invention.
Figure 8:
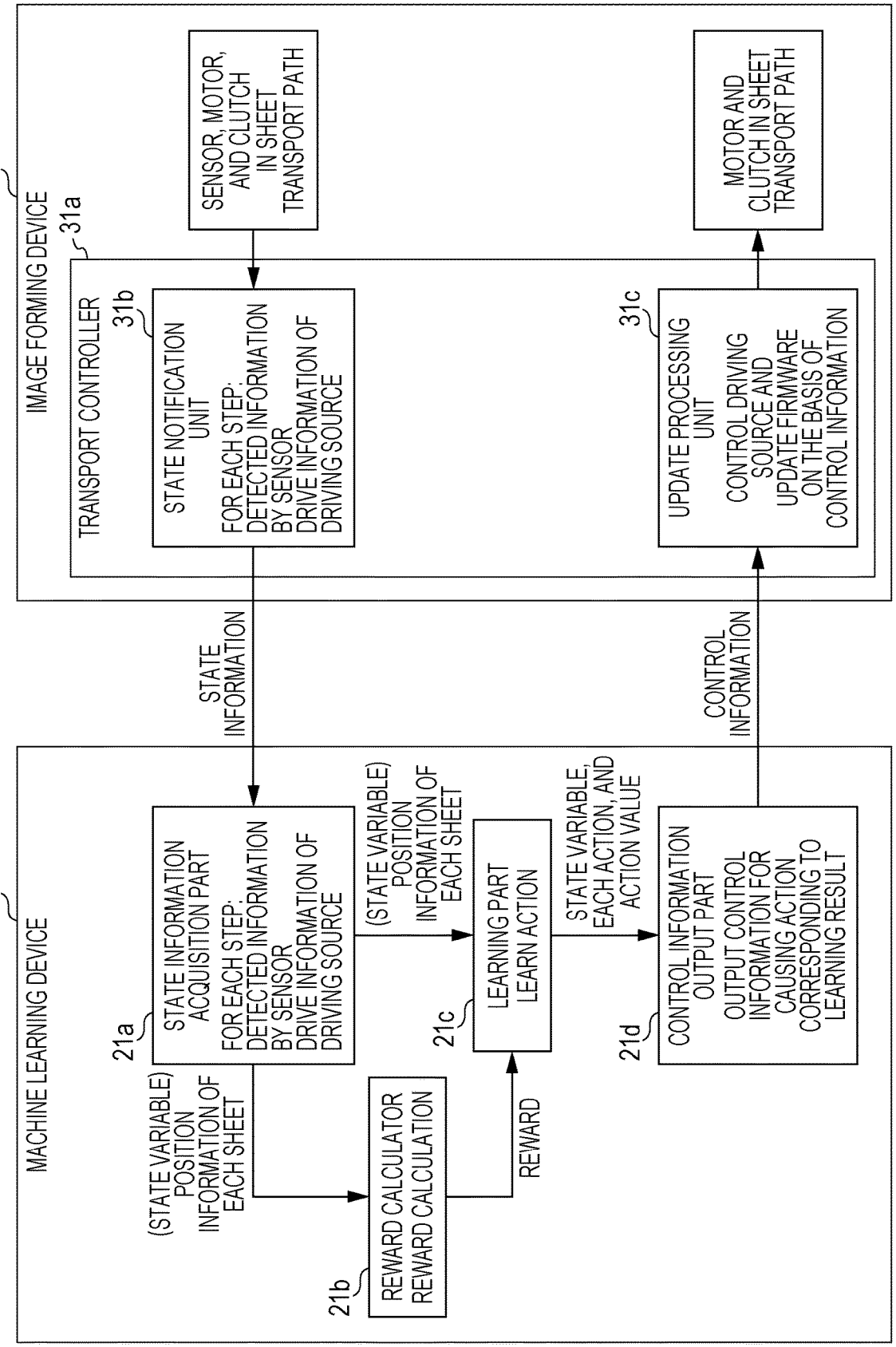
FIG. 8 is a block diagram describing a schematic operation of the control system according to an embodiment of the present invention.
Figure 9:
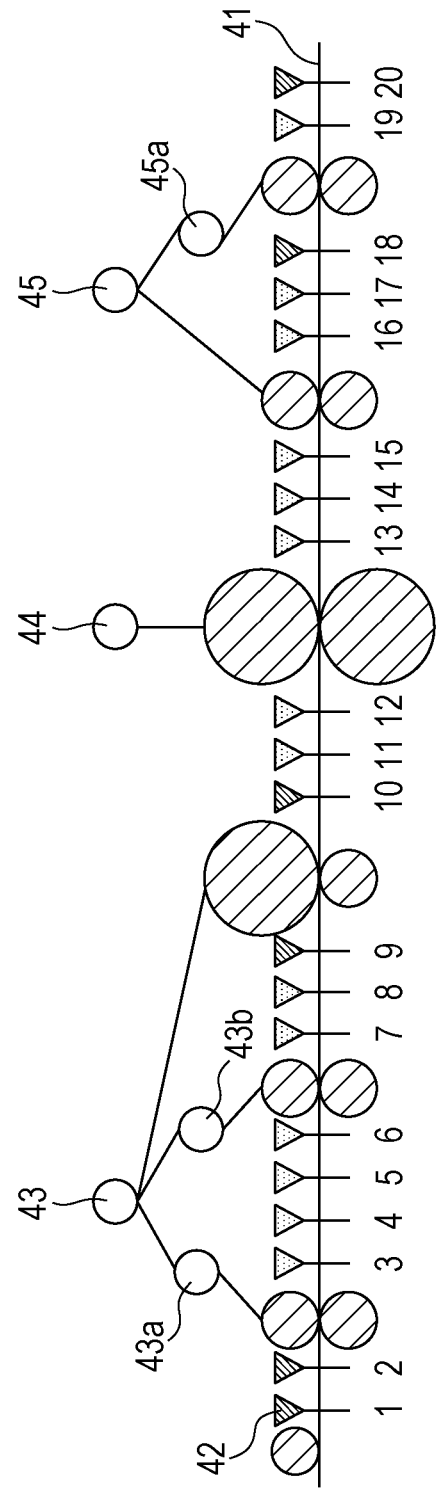
FIG. 9 is a schematic diagram describing another configuration of the sensors and the driving sources in the sheet transport path of the image forming device according to an embodiment of the present invention.
Figure 10:
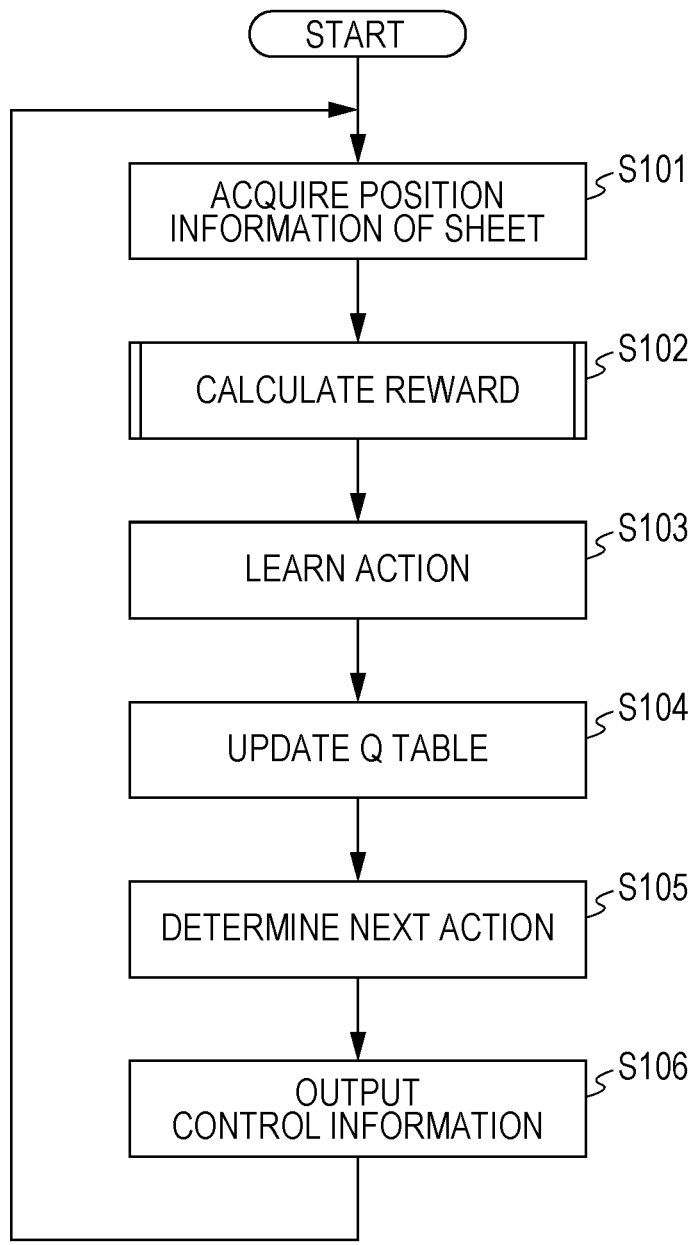
FIG. 10 is a flowchart illustrating an operation of the machine learning device according to an embodiment of the present invention.

In order to describe the above embodiment of the present invention in more detail, a machine learning device, a machine learning method, and a machine learning program according to an embodiment of the present invention will be described with reference to FIGS. 1 to 14. FIGS. 1 and 2 are schematic diagrams each illustrating a configuration of a control system of the present embodiment, and FIGS. 3A and 3B and FIGS. 4A and 4B are block diagrams illustrating configurations of the machine learning device and an image forming device of the present embodiment, respectively. Moreover, FIGS. 5 and 9 are schematic diagrams each describing sensors and driving sources in a sheet transport path of the image forming device according to the present embodiment, FIG. 6 is a schematic diagram describing input/output parameters in the sheet transport path, and FIGS. 7A to 7C are tables illustrating a relationship between a state and an action in the sheet transport path. Moreover, FIG. 8 is a block diagram describing a general operation of the control system according to the present embodiment, and FIGS. 10 to 14 are flowcharts each illustrating an operation of the machine learning device according to the present embodiment.

As illustrated in FIG. 1, a control system 10 of the present embodiment includes a machine learning device 20, a transport device (which corresponds to an image forming device 30 in the present embodiment) that continuously transports at least two transported objects along a transport path, and the like where the machine learning device 20 and the image forming device 30 are connected via a communication network such as a local area network (LAN) or a wide area network (WAN) defined by a standard such as Ethernet (registered trademark), token ring, or fiber-distributed data interface (FDDI). Note that, as illustrated in FIG. 2, the machine learning device 20 may be included in the image forming device 30 (that is, a controller of the image forming device 30 may function as the machine learning device). Hereinafter, each device will be described in detail assuming the system configuration of FIG. 1.

[Machine Learning Device]

The machine learning device 20 is a computer device that provides a cloud service, and learns control conditions for the driving sources of the image forming device 30. As illustrated in FIG. 3A, the machine learning device 20 includes a controller 21, a storage unit 25, a network I/F unit 26, a display unit 27, an operation unit 28, and the like.

The controller 21 includes a central processing unit (CPU) 22 and memories such as a read only memory (ROM) 23 and a random access memory (RAM) 24, and the CPU 22 expands a control program stored in the ROM 23 or the storage unit 25 into the RAM 24 and executes the control program, thereby controlling the operation of the entire machine learning device 20. As illustrated in FIG. 3B, the controller 21 functions as a state information acquisition part 21a, a reward calculator 21b, a learning part 21c, a control information output part 21d, and the like.

The state information acquisition part 21a acquires state information (position information) of at least two transported objects on the transport path on the basis of a result of detection by the sensors provided in the transport path. The position information may be acquired from the result of detection by the sensors provided in the transport path, may be acquired by calculation from the result of detection by the sensors and the speed of movement of the transported objects, may be acquired by calculation from the elapsed time since the output of control information and the speed of movement of the transported objects, or may be acquired by calculation from the elapsed time since the output of the control information and the number of pulses of the control information. The position information can be calculated in consideration of any one of the humidity, temperature, life, slip ratio, paper type, basis weight, size, printing mode, and coverage rate. That is, when the position information is acquired from the result of detection by the sensors, the use environment or use condition of the machine by the user such as the humidity, temperature, life, slip ratio, paper type, basis weight, size, printing mode, or coverage rate is inherent in the position information, or when the position information is calculated using the speed of movement of the transported objects and the elapsed time since the output of the control information, the use environment or use condition of the machine by the user can be included in the position information.

The reward calculator 21b calculates a reward according to a predetermined rule on the basis of the position information acquired by the state information acquisition part 21a. At that time, the reward can be calculated by comparing the time required for one of the at least two transported objects to reach a second position from a first position on the transport path with a predetermined time, or by comparing the distance between two of the at least two transported objects with a predetermined distance. In the latter case, the reward corresponding to the transported objects in a first area of the transport path can be calculated by comparing the distance between the two transported objects with a first predetermined distance, and the reward corresponding to the transported objects in a second area of the transport path can be calculated by comparing the distance between the two transported objects with a second predetermined distance. Also, the reward can be a negative value when the distance between two of the at least two transported objects is shorter than the predetermined distance, or the reward can be calculated on the basis of the position information acquired and the transport speeds of adjacent driving sources. Moreover, the reward calculator 21b can set the reward to a negative value when the position information acquired does not change for a certain period of time, or can calculate the reward according to the positions at which the at least two transported objects are stopped.

The learning part 21c calculates an action value in reinforcement learning (Q learning) on the basis of the state information acquired by the state information acquisition part 21a and the reward calculated by the reward calculator 21b, thereby learning an action (a control condition of the driving source). At that time, in addition to the state information acquired and the reward calculated, the learning can be performed in consideration of any one of the humidity, temperature, life, and slip ratio, or can be performed in consideration of any one of the paper type, basis weight, size, printing mode, and coverage rate.

The control information output part 21d generates control information (such as a control signal, a control current, or a frequency) that causes the driving source to perform an action (an action having the highest action value) determined on the basis of a learning result by the learning part 21c, and outputs the control information to the image forming device 30. Also, the control information output part 21d can generate the control information in consideration of any one of the paper type, basis weight, size, printing mode, and coverage rate when the learning part 21c performs learning in consideration of any one of the humidity, temperature, life, and slip ratio, or can generate the control information in consideration of any one of the humidity, temperature, life, and slip ratio when the learning part 21c performs learning in consideration of any one of the paper type, basis weight, size, printing mode, and coverage rate.

The state information acquisition part 21a, the reward calculator 21b, the learning part 21c, and the control information output part 21d described above may be configured as hardware, or the controller 21 may be configured as a machine learning program to function as the state information acquisition part 21a, the reward calculator 21b, the learning part 21c, and the control information output part 21d, the machine learning program being executed by the CPU 22.

The storage unit 25 includes a hard disk drive (HDD), a solid state drive (SSD), or the like and stores a program for the CPU 22 to control each part, the state information (detected information from the sensors or drive information of the driving sources) acquired from the image forming device 30, the position information acquired by the state information acquisition part 21a, the rules for calculating rewards, the action value calculated by the learning part 21c and the learning result thereby (a Q table described later), the control information generated by the control information output part 21d, and the like.

The network I/F unit 26 includes a network interface card (NIC), a modem, or the like, connects the machine learning device 20 to a communication network, and establishes a connection with the image forming device 30.

The display unit 27 includes a liquid crystal display (LCD), an organic electroluminescence (EL) display, or the like and displays various screens.

The operation unit 28 includes a mouse, a keyboard, or the like and enables various operations.

[Image Forming Device]

The image forming device 30 is a device that continuously transports at least two transported objects (sheets) along the transport path. As illustrated in FIG. 4A, the image forming device includes a controller 31, a storage unit 35, a network I/F unit 36, a display/operation unit 37, an image processing unit 38, an image reading unit 39, a print processing unit 40, and the like.

The controller 31 includes a CPU 32 and memories such as a ROM 33 and a RAM 34, and the CPU 32 expands a control program stored in the ROM 33 or the storage unit 35 into the RAM 34 and executes the control program, thereby controlling the operation of the entire image forming device 30. As illustrated in FIG. 4B, the controller 31 functions as a transport controller 31a that controls the transport of sheets, and the transport controller 31a functions as a state notification unit 31b, an update processing unit 31c, and the like.

The state notification unit 31b monitors the sensors and driving sources (such as motors and/or clutches) provided in the sheet transport path of the print processing unit 40, and notifies the machine learning device 20 of the state information such as the detected information by the sensors and the drive information of the driving sources (for example, the rotational frequency of the motor, the distance of transport of a sheet per rotation of the motor, or the speed of transport of a sheet corresponding to the rotational frequency of the motor).

The update processing unit 31c acquires the control information from the machine learning device 20, and updates firmware that controls the operation of the driving sources (such as the motors and/or clutches) on the basis of the control information. At that time, the firmware may be updated each time the control information is acquired from the machine learning device 20, or may be updated collectively after a plurality of pieces of the control information is acquired.

The storage unit 35 includes an HDD, an SSD, or the like and stores a program for the CPU 32 to control each unit, information on processing functions of its own device, device information, image data generated by the image processing unit 38, and the like.

The network I/F unit 36 includes an NIC, a modem, or the like, connects the image forming device 30 to a communication network, and establishes a connection with the machine learning device 20 or the like.

The display/operation unit (operation panel) 37 is, for example, a touch panel in which a pressure-sensitive or capacitive operation unit (touch sensor) with transparent electrodes arranged in a grid pattern is provided on a display unit, and displays various screens related to print processing to enable various operations related to the print processing.

The image processing unit 38 functions as a raster image processor (RIP), generates intermediate data by translating a print job, and generates bitmap image data by rendering. The image processing unit 38 further performs screen processing, gradation correction, density balance adjustment, thinning, halftone processing, and the like on the image data as necessary. Then, the image processing unit 38 outputs the image data generated to the print processing unit 40.

The image reading unit (ADU) 39 is a part that optically reads image data from a document placed on a document table, and includes a light source that scans the document, an image sensor such as charge coupled devices (CCDs) that converts light reflected by the document into an electric signal, an analog-to-digital (A/D) converter that performs A/D conversion on the electric signal, and the like. Then, the image reading unit 39 outputs the image data read to the print processing unit 40.

The print processing unit 40 executes print processing on the basis of the image data acquired from the image processing unit 38 or the image reading unit 39. The print processing unit 40 includes, for example: an exposure unit that performs exposure by radiating a laser beam on the basis of the image data; an image forming unit that includes a photosensitive drum, a development unit, a charging unit, a photoreceptor cleaning unit, and a primary transfer roller and forms a toner image in the colors of cyan, magenta, yellow, and black (CMYK); an intermediate belt that is rotated by a roller and functions as an intermediate transfer body that transports the toner image formed by the image forming unit to a sheet; a secondary transfer roller that transfers the toner image formed on the intermediate belt to the sheet; a fixing unit that fixes the toner image transferred to the sheet, a feed unit such as a tray that feeds a sheet; a transport unit such as a feed roller, a registration roller, a loop roller, a reverse roller, and a discharge roller (these rollers are collectively referred to as transport rollers); the sensors that are provided in the transport path of the transport unit and detect the transport position of the sheet; and the driving sources (such as the motors and the clutches for switching transmission of power of the motors) that drive the transport unit. The sensors may each be any sensor that can detect the transport position of the sheet such as one that detects the transport position on the basis of light turned on/off, contact of an electric contact, or the like. Moreover, the driving sources may each be any driving source that can supply power for driving the transport rollers, and the types of the motors and clutches, the power transmission structure of the motors, and the like are not particularly limited.

Note that FIGS. 1 to 4A and 4B are examples of the control system 10 of the present embodiment, and the configuration and control of each device can be modified as appropriate. For example, FIGS. 4A and 4B illustrate the image forming device 30 as a device that continuously transports at least two transported objects along the transport path, but the device may be, for example, a post-processing device that performs post-processing such as binding and folding, a sorting device that sorts sheets, or an inspection device that inspects an image formed on a sheet. Moreover, the control system 10 in FIG. 1 includes the machine learning device 20 and the image forming device 30, but the control system 10 may include a computer device of a development department or a distributor, in which case the computer device may receive an individual request of a user who uses the image forming device 30 and notify the machine learning device 20 of the individual request, and the machine learning device 20 may change the product specification according to the individual request.

Next, the sensors and the driving sources in the sheet transport path of the image forming device 30 will be described. FIG. 5 is a schematic diagram illustrating a sheet transport path 41 in the print processing unit 40, where a sheet is assumed to be transported from left to right in the figure. In the sheet transport path 41, for example, a plurality of sensors 42 (20 sensors arranged at positions numbered 1 to 20 in the figure) is arranged. Also in the sheet transport path 41, a plurality of rollers (black circles in the figure) that transports a sheet is arranged, and as driving sources of the rollers, for example, a main motor 43, a fixing motor 44, and a discharge motor 45 are included. The main motor 43 includes a feed clutch 43a and a timing clutch 43b that turn on/off transmission of power of the motor, and the discharge motor 45 includes a discharge clutch 45a that turns on/off transmission of power of the motor. Note that FIG. 5 is an example of the sheet transport path 41, and the number and arrangement of each of the sensors 42, the rollers, the motors, and the clutches can be changed as appropriate.

In the sheet transport path 41 having such a configuration, as illustrated in FIG. 6, state information such as a result of detection by the sensors 42 serves as an input parameter, and control information such as a control signal, a control current, and a frequency of each of the main motor 43 (the feed clutch 43a and the timing clutch 43b), the fixing motor 44, and the discharge motor 45 (the discharge clutch 45a) serves as an output parameter, so that the machine learning device 20 learns a relationship between the input parameter and the output parameter.

FIGS. 7A to 7C are tables used when the machine learning device 20 learns the relationship between the input parameter and the output parameter, where FIG. 7A illustrates details of states (on/off combinations of the sensors 42), FIG.

7B illustrates details of actions (on/off combinations of the clutches in this case), and FIG. 7C is a Q table illustrating action values (Q values) corresponding to combinations of the states and the actions.

Note that in this table, the number of the sensors 42 is set to 14, and the number of states Ns at this time is:
Ns=number of sensor states^number of sensors=2^14=16384. Also in this table, the target of the actions are the clutches, the number of which is three, and the number of actions Na at this time is:
Na=number of clutch states^number of clutches=2^3=8.
Therefore, the size of the Q table is:

$$Q[Ns,Na]=Q[16384,8].$$

The machine learning device 20 calculates a reward when a certain action is performed in a certain state according to a predetermined rule, calculates an action value (Q value) according to a predetermined calculation formula such that a sum of the rewards is optimized, learns an action by updating the Q table, and determines an action on the basis of a learning result (selects an action having the highest action value).

Note that when "α" represents a learning rate, "γ" represents a discounted reward, and "$r_t$" represents a reward at time "t", an action value (Q ($s_t$, $a_t$)) can be calculated by, for example, a calculation formula of Q learning such as $$Q(s_t,a_t) \leftarrow (1-\alpha)Q(s_t,a_t)+\alpha(r_{t+1}+\gamma \max Q(s_{t+1},a_{t+1})).$$

FIG. 8 is a block diagram illustrating an outline of sheet transport control performed by the control system 10 of the present embodiment. The transport controller 31a (the state notification unit 31b) of the image forming device 30 acquires state information such as detected information by the sensors and drive information of the driving sources (for example, the rotational frequency of the motor) for each step (predetermined time) from output signals of the sensors 42 and the motors provided in the sheet transport path 41, and outputs the state information to the machine learning device 20. The state information acquisition part 21a of the machine learning device 20 acquires position information of each sheet as a state variable on the basis of the state information, and notifies the reward calculator 21b of the position information, and then the reward calculator 21b calculates a reward on the basis of the position information and notifies the learning part 21c of the reward. The learning part 21c learns an action by calculating an action value on the basis of the position information of each sheet acquired from the state information acquisition part 21a and the reward acquired from the reward calculator 21b, thereby notifying the control information output part 21d of a learning result (the state variable, each action, and action value). The control information output part 21d generates control information such as a control signal, a control current, and a frequency for causing the driving sources to perform an action determined on the basis of the learning result, and notifies the image forming device 30 of the control information. The transport controller 31a (the update processing unit 31c) of the image forming device 30 updates firmware for driving the driving sources such as the motors and/or clutches according to the control information acquired from the machine learning device 20, and controls the operation of the motors and/or clutches according to the firmware.

Note that although FIG. 5 illustrates the case where the position of a sheet is identified from the output signals (on/off) of the sensors 42 that are twenty in number and arranged on the sheet transport path 41, when the drive information of the driving sources or the like is used, the number of the actual sensors 42 (black triangles in the figure) may be reduced, and virtual sensors 42 (dotted triangles in FIG. 9) may be arranged according to the output signals of the sensors 42, drive signals of the motors, and physical parameters (such as the distance of transport of a sheet per rotation of the motor and the speed of transport of a sheet corresponding to the rotational frequency of the motor).

Hereinafter, a machine learning method of the machine learning device 20 of the present embodiment will be described. The CPU 22 of the controller 21 of the machine learning device 20 expands a machine learning program stored in the ROM 23 or the storage unit 25 in the RAM 24 and executes the machine learning program, thereby executing processing of each step illustrated in flowcharts of FIGS. 10 to 14.

First, when the print processing unit 40 of the image forming device 30 starts transporting a sheet, the controller 21 (the state information acquisition part 21a) of the machine learning device 20 acquires state information such as detected information by the sensors 42 and drive information of the driving sources from the controller 31 (the state notification unit 31b) of the image forming device 30, and acquires position information of the sheet on the basis of the state information (S101). The position information may be acquired from the detected information by the sensors 42, or may be acquired by calculation from the detected information by the sensors 42 and the drive information of the driving sources. Also, the position information can be calculated in consideration of any one of the humidity, temperature, life, slip ratio, paper type, basis weight, size, printing mode, and coverage rate.

Next, the controller 21 (the reward calculator 21b) calculates a reward on the basis of the position information of the sheet (S102). Details of the calculation of the reward will be described later. Next, on the basis of the position information of the sheet acquired by the state information acquisition part 21a and the reward calculated by the reward calculator 21b, the controller 21 (the learning part 21c) calculates an action value (Q value) using the calculation formula of Q learning described above or the like, thereby learning an action (S103) and updating a Q table (S104). At that time, in addition to the position information of the sheet and the reward, the learning part 21c can perform learning in consideration of any one of the humidity, temperature, life, and slip ratio, or can perform learning in consideration of any one of the paper type, basis weight, size, printing mode, and coverage rate.

Then, the controller 21 (the control information output part 21d) determines a next action on the basis of a learning result (the Q table) (S105), generates control information (such as a control signal, a control current, and a frequency) that causes the driving sources to perform the action determined, and outputs the control information to the image forming device 30 (S106). At that time, the control information output part 21d can generate the control information in consideration of any one of the paper type, basis weight, size, printing mode, and coverage rate as well when the learning part 21c performs learning in consideration of any one of the humidity, temperature, life, and slip ratio, or can generate the control information in consideration of any one of the humidity, temperature, life, and slip ratio as well when the learning part 21c performs learning in consideration of any one of the paper type, basis weight, size, printing mode, and coverage rate. Then, upon acquiring the control information from the machine learning device 20, the controller 31 (the update processing unit 31c) of the image forming device 30 updates firmware that controls the operation of the driving sources on the basis of the control signal, thereby driving the driving sources according to the firmware updated and transporting the sheet. After that, the processing returns to S101 to repeat similar processing.

Next, the reward calculation in S102 will be described. There are several methods of calculating the reward such as a method of calculating the reward on the basis of a sheet pitch (the distance or time interval between sheets), and a method of calculating the reward on the basis of an operation time.

Figure 11:
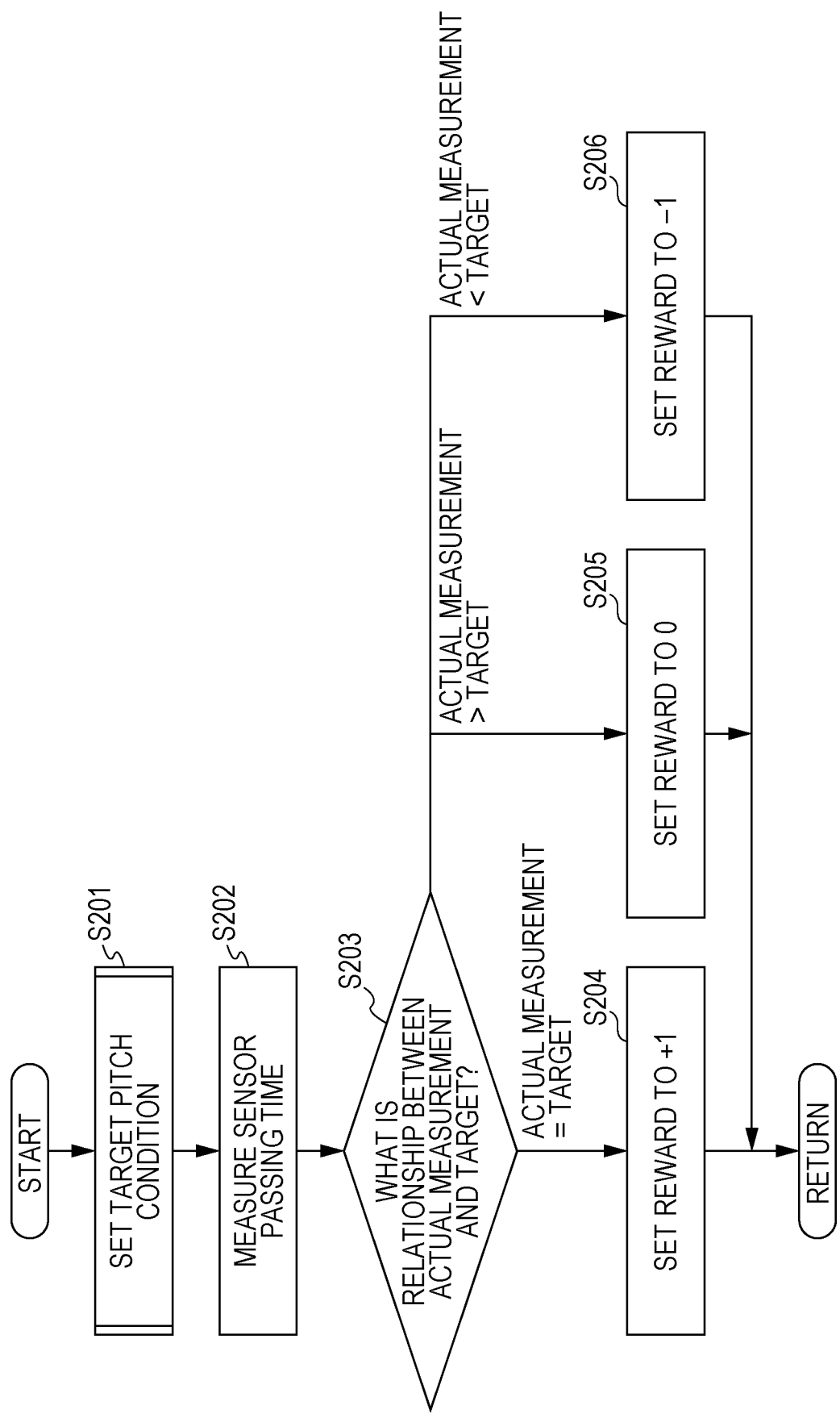
FIG. 11 is a flowchart illustrating an operation (reward calculation processing based on pitch) of the machine learning device according to an embodiment of the present invention.
Figure 12:
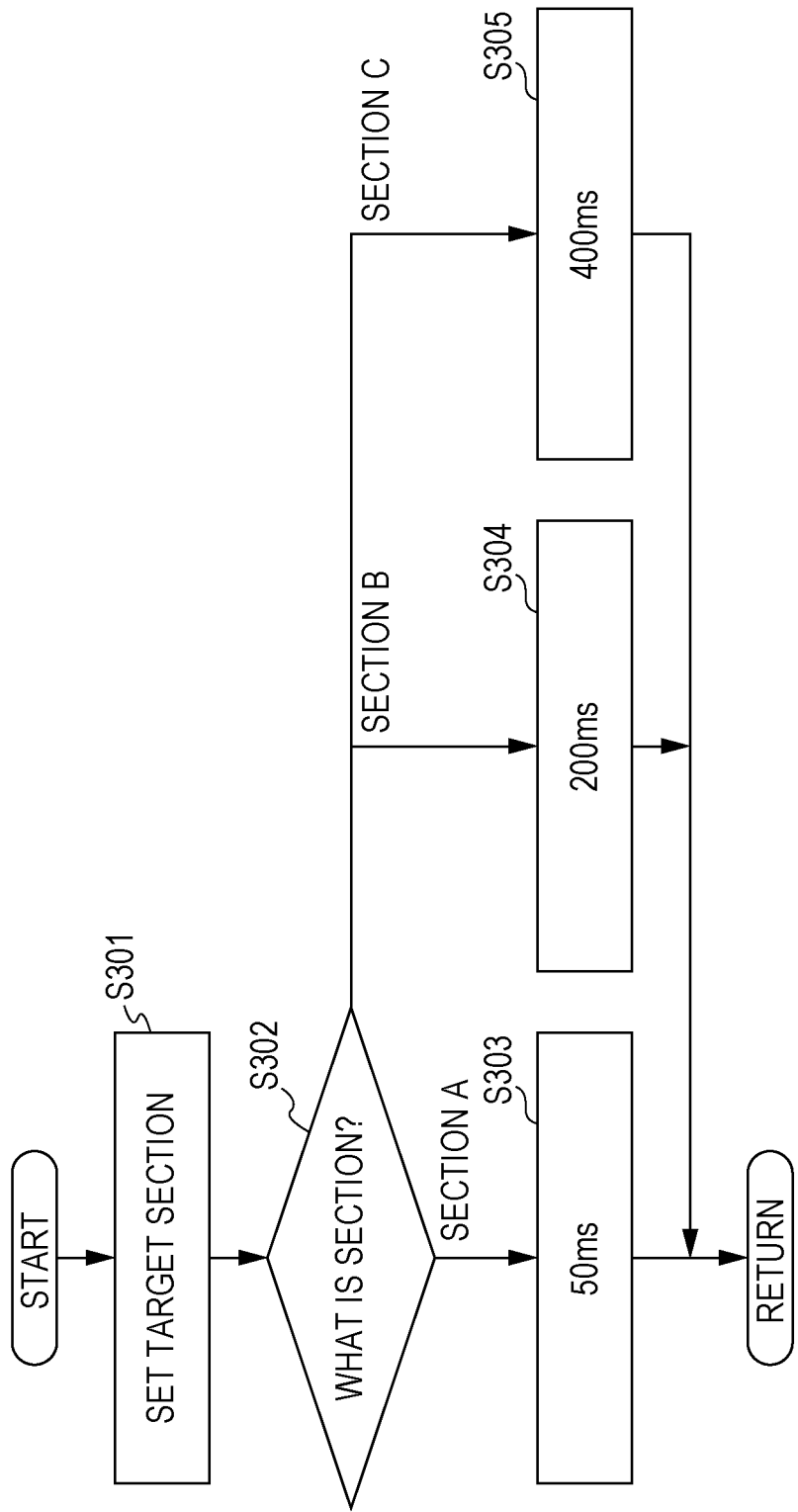
FIG. 12 is a flowchart illustrating an operation (target pitch condition setting processing) of the machine learning device according to an embodiment of the present invention.

FIG. 11 is an example of the method of calculating the reward on the basis of the sheet pitch (time interval). The reward calculator 21b sets a target pitch condition (S201). FIG. 12 illustrates details of this step where, first, a target section is set (S301). Next, a section is determined (S302), and the target pitch is set to a first value (50 ms in this case) (S303) if the section is determined to be section "A", the target pitch is set to a second value (200 ms in this case) (S304) if the section is determined to be section "B", or the target pitch is set to a third value (400 ms in this case) (S305) if the section is determined to be section "C". Returning to FIG. 11, the reward calculator 21b measures sensor passing time (the time from when a certain sheet passes through the sensor to when a next sheet passes through the sensor, that is, the time interval between the transport of two sheets) (S202), and determines a relationship between the actual measurement in S202 and the target in S201 (S203). If the actual measurement is substantially equal to the target, the sheets are being transported as set so that the reward is set to a predetermined positive value (for example, "+1") (S204). If the actual measurement is longer than the target, the sheets are not being transported as set, but are not at risk of collision with each other so that the reward is set to "0" (S205). If the actual measurement is shorter than the target, the sheets may collide with each other so that the reward is set to a predetermined negative value (for example, "−1") (S206).

Note that although the reward is calculated on the basis of the time interval between the two sheets in FIGS. 11 and 12, the reward may be calculated on the basis of the distance between the two sheets. In that case, if the distance between the two sheets is shorter than a target distance, the sheets may collide with each other so that the reward can be set to a predetermined negative value.

Figure 13:
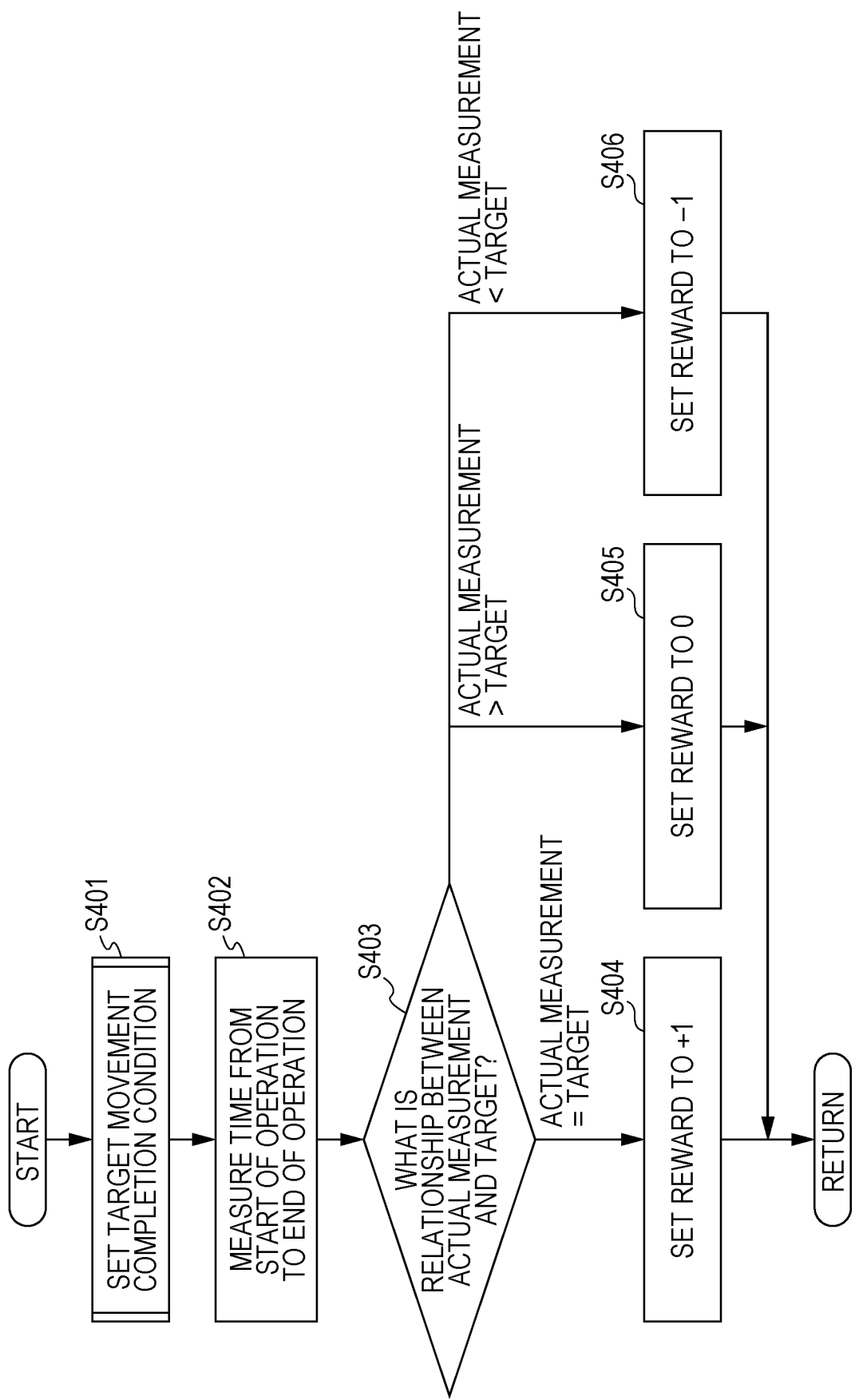
FIG. 13 is a flowchart illustrating an operation (reward calculation processing based on operation time) of the machine learning device according to an embodiment of the present invention.
Figure 14:
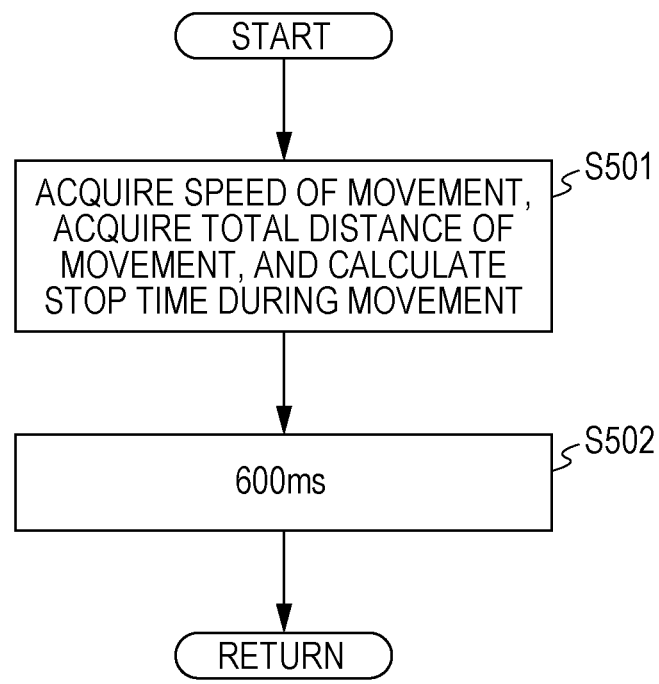
FIG. 14 is a flowchart illustrating an operation (target movement completion condition setting processing) of the machine learning device according to an embodiment of the present invention.

FIG. 13 is an example of the method of calculating the reward on the basis of the operation time. The reward calculator 21b sets a target movement completion condition (S401). FIG. 14 illustrates details of this step where, first, the speed of movement and the total distance of movement are acquired from a change in the position information of the sheet, and the stop time during the movement is calculated (S501). Then, from these pieces of information, the target movement completion condition is set to a predetermined value (600 ms in this case) (S502). Returning to FIG. 13, the reward calculator 21b measures the time from the start of the operation to the end of the operation (S402), and determines a relationship between the actual measurement and the target (S403). If the actual measurement is substantially equal to the target, the sheets are being transported as set so that the reward is set to a predetermined positive value (for example, "1") (S404). If the actual measurement is longer than the target, the sheets are not being transported as set, but are not at risk of collision with each other so that the reward is set to "0" (S405). If the actual measurement is shorter than the target, the sheets may collide with each other so that the reward is set to a predetermined negative value (for example, "−1") (S406).

Note that FIGS. 11 and 12 illustrate the method of calculating the reward on the basis of the sheet pitch, and FIGS. 13 and 14 illustrate the method of calculating the reward on the basis of the operation time. Alternatively, however, the reward may be calculated on the basis of both the sheet pitch and the operation time, or may be calculated by adding another parameter to the sheet pitch and/or the operation time.

When the position information acquired does not change for a certain period of time, it is assumed that a jam has occurred, so that the reward may be set to a negative value or may be calculated depending on the stop positions of at least two transported objects (depending on whether or not the transported objects have stopped at predetermined stop positions). Also, the sheet may be bent or pulled depending on a driving state of the driving sources (for example, when the transport speeds of adjacent driving sources are different), so that the reward may be calculated in consideration of such a problem.

As described above, the position information of the sheets is acquired, the reward is calculated according to the preset rule, the action is learned by calculating the action value in reinforcement learning on the basis of the position information and the reward, and the control information that causes the driving sources to perform the action determined on the basis of the learning result is output, whereby the transport control on the transported objects suitable for the use environment and use condition of the machine by the user can be achieved.

Note that the present invention is not limited to the above embodiment, and the configurations and controls thereof can be modified as appropriate without departing from the spirit of the present invention.

For example, the above embodiment describes the case where the machine learning method of the present invention is applied to the image forming device that performs processing by controlling the transport of the plurality of sheets, but the machine learning method of the present invention can be similarly applied to any device that performs processing by controlling the transport of a plurality of moving objects.

The present invention is applicable to a machine learning device, a machine learning method, and a machine learning program for learning an action of a driving source in a transport device controlling transport of a plurality of moving objects, and to a recording medium on which the machine learning program is recorded.

Although embodiments of the present invention have been described and illustrated in detail, the disclosed embodiments are made for purposes of illustration and example only and not limitation. The scope of the present invention should be interpreted by terms of the appended claims.

What is claimed is:

1. A machine learning device that learns an action of a driving source device in a transport device continuously transporting at least two transported objects along a transport path, wherein the driving source device is a motor or a clutch that switches transmission of power of the motor, the machine learning device comprising:
 a hardware processor that:

acquires position information of the at least two transported objects on the transport path on the basis of a result of detection by a sensor provided in the transport path;
calculates a reward on the basis of a time interval between the two transported objects or a distance between the two objects using the position information acquired, according to a predetermined rule;
learns an action by calculating an action value in reinforcement learning on the basis of the position information acquired and the reward calculated; and
generates and outputs control information, wherein the control information includes at least one of a control signal, a control current, and a frequency with which the motor and/or the clutch is operated, that causes the driving source device to perform an action determined on the basis of a learning result.

2. The machine learning device according to claim 1, wherein
the hardware processor acquires the position information from the result of detection by the sensor, from calculation based on the result of detection by the sensor and a speed of movement of each of the transported objects, from calculation based on an elapsed time since the output of the control information and the speed of movement of each of the transported objects, or from calculation based on the elapsed time since the output of the control information and the number of pulses of the control information.

3. The machine learning device according to claim 1, wherein
the hardware processor calculates the reward by comparing a time required for one of the at least two transported objects to reach a second position from a first position on the transport path with a predetermined time.

4. The machine learning device according to claim 1, wherein
the hardware processor calculates the reward by comparing a distance between two of the at least two transported objects with a predetermined distance.

5. The machine learning device according to claim 4, wherein
the hardware processor calculates the reward corresponding to the transported objects in a first area of the transport path by comparing the distance between the transported objects with a first predetermined distance, and calculates the reward corresponding to the transported objects in a second area of the transport path by comparing the distance between the transported objects with a second predetermined distance.

6. The machine learning device according to claim 4, wherein
the hardware processor sets the reward to a negative value when the distance between the two of the at least two transported objects is shorter than the predetermined distance.

7. The machine learning device according to claim 1, wherein
the hardware processor calculates the reward on the basis of the position information acquired and transport speeds of adjacent ones of the driving source devices.

8. The machine learning device according to claim 1, wherein
the hardware processor sets the reward to a negative value when the position information acquired does not change for a certain period of time.

9. The machine learning device according to claim 1, wherein
the hardware processor calculates the reward in accordance with stop positions of the at least two transported objects.

10. The machine learning device according to claim 1, wherein
the transport device is an image forming device that transports and prints a sheet.

11. The machine learning device according to claim 10, wherein
the hardware processor considers any one of humidity, temperature, life, slip ratio, paper type, basis weight, size, printing mode, and coverage rate as well when calculating the position information.

12. The machine learning device according to claim 10, wherein
the hardware processor performs learning in consideration of any one of humidity, temperature, life, and slip ratio in addition to the position information acquired and the reward calculated, and
the hardware processor generates the control information in consideration of any one of paper type, basis weight, size, printing mode, and coverage rate as well.

13. The machine learning device according to claim 10, wherein
the hardware processor performs learning in consideration of any one of paper type, basis weight, size, printing mode, and coverage rate in addition to the position information acquired and the reward calculated, and
the hardware processor generates the control information in consideration of any one of humidity, temperature, life, and slip ratio as well.

14. A transport device comprising the machine learning device according to claim 1.

15. A machine learning method of a machine learning device that learns an action of a driving source device in a transport device continuously transporting at least two transported objects along a transport path, wherein the driving source device is a motor or a clutch that switches transmission of power of the motor, the machine learning method comprising:
acquiring position information of the at least two transported objects on the transport path on the basis of a result of detection by a sensor provided in the transport path;
calculating a reward on the basis of a time interval between the two transported objects or a distance between the two objects using the position information acquired, according to a predetermined rule;
learning an action by calculating an action value in reinforcement learning on the basis of the position information acquired and the reward calculated; and
generating and outputting control information, wherein the control information includes at least one of a control signal, a control current, and a frequency with which the motor and/or the clutch is operated, that causes the driving source device to perform an action determined on the basis of a learning result.

16. A non-transitory recording medium storing a computer readable machine learning program running on a machine learning device that learns an action of a driving source device in a transport device continuously transporting at least two transported objects along a transport path, wherein the driving source device is a motor or a clutch that switches transmission of power of the motor, wherein a hardware processor of the machine learning device is caused to execute:

acquiring position information of the at least two transported objects on the transport path on the basis of a result of detection by a sensor provided in the transport path;

calculating a reward on the basis of a time interval between the two transported objects or a distance between the two objects using the position information acquired, according to a predetermined rule;

learning an action by calculating an action value in reinforcement learning on the basis of the position information acquired and the reward calculated; and generating and outputting control information, wherein the control information includes at least one of a control signal, a control current, and a frequency with which the motor and/or the clutch is operated, that causes the driving source device to perform an action determined on the basis of a learning result.

17. The machine learning device according to claim 1, wherein the transported object is a sheet.

* * * * *